Oct. 26, 1965 J. G. LINHART 3,214,342
PROCESS FOR PRODUCING INTENSE MAGNETIC FIELDS
FOR THE PURPOSE OF CONFINING A PLASMA
Filed June 22, 1961

INVENTOR.
JIRI GEORGE LINHART
BY Hammond and Littell
ATTORNEYS

United States Patent Office 3,214,342
Patented Oct. 26, 1965

3,214,342
PROCESS FOR PRODUCING INTENSE MAGNETIC FIELDS FOR THE PURPOSE OF CONFINING A PLASMA
Jiri George Linhart, Via di Sale, Frascati, Italy
Filed June 22, 1961, Ser. No. 118,987
Claims priority, application Belgium, July 5, 1960, 470,828, Patent 592,646; Apr. 7, 1961, 479,469, Patent 602,347
10 Claims. (Cl. 176—1)

It is known that gases raised to very high temperatures (of the order of several million degrees) are completely ionised in the form of plasmas, and that certain atomic nuclei can then undergo fusion reactions with the production of a large quantity of energy.

Various processes have been developed to heat the plasma (Joule effect, magnetic pumping, etc.) and to confine it (by the employment of magnetic fields), and were described in the "Proceedings of the Second International Conference on the Use of Atomic Energy for Peaceful Purposes," volumes Nos. 31 and 32 (Geneva, September 1958).

Moreover, in Belgian Patent No. 585,281 applied for on December 3, 1959, corresponding to U.S. Patent 3,113,917, the applicant described improvement in processes and devices for producing energy by nuclear fusion, enabling discharges to be obtained at very high temperature.

To recall the notations used in this patent:

$N$: linear ion density of the plasma,
$R_0$: radius of plasma which is assumed to be cylindrical,
$x$: confinement quality factor, that is to say the ratios between mean thermal velocity $w$ ($10^8$ cm./s.) and velocity of radial expansion, the condition for the production of energy in a mixture of deuterium and tritium is written down (in CGS):

$$\frac{N}{R_0} > \frac{1}{x} 2.10^{22}$$

From this inequality may be deduced the three conclusions that $N$ must be large, $R_0$ must be small and $x$ must be large. The first two requirements are satisfied with the aid of the means described in the patent cited.

As regards the quality factor $x$, if its value is less than or equal to 100, the confining magnetic fields must be of the order of $10^7$ gauss for a radius $R_0$ equal to one centimetre. The value of $x$ should therefore be fixed at about 1,000 in order to have both a confinement lasting for about one microsecond and a degree of energy dissipation technically acceptable.

Under these conditions, and regard being had to the fact that the volume density $n$ of the plasma confined by a magnetic field B is always limited by the condition:

$$\frac{B^2}{8\pi} > 2nkT$$

$B$ = magnetic induction = magnetic field (in vacuo)
$k$ = Boltzmann's constant
$T$ = absolute temperature of the plasma ($10^9$ ° K.)

the magnetic confinement field B is determined by the inequality:

$$B > \frac{2.10^8}{(xR_0)^{1/2}} \text{ in gauss}$$

It will be seen that if $R_0 = 0.1$ cm. this condition requires a magnetic field $B > 20$ megagauss. A field of such intensity cannot be obtained by using solid conductors.

The appended drawing illustrates a form of embodiment of the invention by way of example.

The present invention relates to a process and appliance for producing magnetic field of several megagauss for the purpose of confining a plasma in order to enable fusion reactions to take place in it.

According to this process, a gas is introduced peripherally into a highly evacuated cylindrical enclosure immediately after a central column of plasma has been produced in it, and the gas is subjected to a series of electrical discharges co-axial with the central column of plasma, causing the said gas to assume the shape of a centripetally moving annular column which compresses the field confining the central column of plasma.

The annular column may be of the same nature as the central column of plasma which it is desired to confine, but it may also be of a different nature. In this case, it may be formed from a sheet of an element having an atomic number lower than 31. This sheet which is vaporised by the electrical discharge is preferably formed of a metal such as lithium or aluminium.

The central column of plasma may be an ionised mixture of deuterium and tritium, obtained by vaporising a wire of tritiated lithium deuteride.

The field confining the annular column is preferably of the same origin as the field confining the central column of plasma, and the voltage from a source of several tens of kilovolts is advantageously used for the electrical discharges.

The appliance for using the process comprises a cylindrical enclosure having a wall made of a material which is an electrical insulator and permeable to gases, and a circular base equipped with a plurality of circular electrical-discharge devices which are concentric with the axis of the enclosure and capable of producing trains of electrical discharges of several tens of kilovolts.

Each electrical-discharge device may comprise a circular electrode which passes into the enclosure via an insulated part of the base thereof, and is connected via switches to batteries of condensers. Operation of the switchs may be so regulated that the switches connected to an electrical-discharge device close and open simultaneously, but operation of the switches is staggered between adjacent outer and inner electrical-discharge devices, so that while an annular column of gas is moving centripetally it successively receives one pulse per electrical discharge upon passing each of the concentric electrodes.

The electrical-discharge devices may each be capable of producing discharges at a frequency of the order of a hundred per second.

Figure 1:
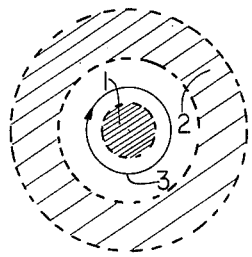
FIGURE 1 is a transverse section through columns of plasma and gas.

The process aims at compressing the azimuthal magnetic field B (3, FIGURE 1) of the central column of plasma 1 by converging the peripheral annular column of gas 2 until all the kinetic energy of the latter is transformed into potential energy of the field B and thermal energy of the column 1.

The amplification G of the initial magnetic field $B_{01}$ (3, FIGURE 1) may be evaluated as explained below, in schematic fashion, in the case in which the central column of plasma 1 remains rigid $$G = \frac{B_{02}}{B_{01}}$$

Where $B_{02}$ represents the maximum value of the azimuthal magnetic field $B\varphi$ of the plasma at the moment when the internal radius R of the peripheral column 2 of plasma reaches its minimum value $R_2$, viz. at the end of the implosion.

In the absence of energy losses, and with an incompressible plasma envelope, the expression for the kinetic energy $W_c$ of the said envelope is:

$$W_c = \tfrac{1}{2} NMw^2 \qquad (a)$$

where the significance of N and $w$ is as already indicated, and M designates the mean ion mass.

Moreover, the field B obeys the law of distribution.

$$B(t) = B_0(t) \frac{R}{r}$$

where $t$ denotes the time factor on which the value of the magnetic field depends, in the space between $r$ (radius of the central column 1) and R (internal radius of the peripheral column 2), so that after integration of the variation of potential energy in the said field B while the peripheral column is contracting from the radius $R_1$ to the radius $R_2$, one obtains $$2NMw^2 = B_{02}^2 R_1^2 \ln\frac{R_2}{r} - B_{01}^2 R_1^2 \ln\frac{R_1}{r} \qquad (b)$$

Moreover, the integrated law of flux conservation requires that:

$$B_{01} \ln\frac{R_1}{r} = B_{02} \ln\frac{R_2}{r} \qquad (c)$$

This relationship in addition governs the compression of the field B.

Solving the Equations $b$ and $c$ in relation to $$\ln\frac{R_2}{r}$$

one obtains:

$$\frac{B_{02}}{B_{01}} = G = \frac{W_{C1}}{W_{M1}} + 1$$

where $W_{C1}$ and $W_{M1}$ represent respectively the kinetic energy and the magnetic potential energy of the column of plasma at the moment $t_1$ (corresponding to the value $R_1$ of the internal radius of the peripheral column, i.e. at the beginning of the implosion).

If consideration is now given to an analogous system in which the central conductor (of radius $r$) is a compressible column of plasma of linear density $N_0$, and of a radius variable from $r_1$ to $r_2$, the compression of the field B by the convergent envelope of plasma of radius R may again be evaluated starting from the laws of conservation of total energy and magnetic flux.

Introduction of the compressible plasma is represented by a new equation of state; but in the present case the density of the particles is sufficiently high for it to be assumed that binary collisions produce a homogeneous distribution of statistical velocities every time.

Thus, the equation of state is written down $$\frac{T_2}{T_1} = \left(\frac{r_1}{r_2}\right)^{4/3} \qquad (d)$$

Combining this equation with the equations of conservation gives:

$$2NMw^2 = B_{01}^2 r_1^2 \ln\frac{R_1}{r_1}\left[\left(\frac{r_2}{r_1}\right)\frac{B_{02}}{B_{01}} - 1\right] + 12N_0 k T_1$$

$$\left[\left(\frac{r_1}{r_2}\right)^{4/3} - 1\right] \qquad (e)$$

Moreover, it may also be assumed that the magnetic pressure at the boundary of the plasma is equal to the pressure of the plasma, which leads to the relationship:

$$\frac{r_1}{r_2} = \frac{(B_{02})^{3/5}}{(B_{01})^{3/5}}$$

Taking into account this last relationship, the Equation $e$ and the equalities $$W_{C1} = \tfrac{1}{2} NMw^2$$
$$W_{T1} = 3N_0 k T1$$
$$W_{M1} = \tfrac{1}{4} B_{01}^2 r_1^2 \ln\frac{R_1}{r_1}$$

the following relationship is obtained:

$$\frac{W_{C1}}{W_{M1}} + 1 = G^{2/5} + \frac{W_{T1}}{W_{M1}}\left(G^{4/5} - 1\right) \qquad (f)$$

since it is proposed to work with $W_{C1} \gg W_{M1}$, i.e. with a high amplification G, this gives approximately:

$$G^{4/5} \approx \frac{W_{C1}}{W_{T1}}$$

Finally, the values of the various parameters are thus obtained as a function of G;

$$\frac{r_1}{r_2} = G^{3/5}$$

$$T_2 = G^{4/5} T_1$$

$$\Delta r = R_2 - r_2 = r_1 G^{-1} \ln\frac{R_1}{r_1}$$

and the ratio of stored thermal energy to potential magnetic energy, at the end of compression:

$$\frac{W_{T2}}{W_{M2}} = \tfrac{3}{4} G^{2/5}\left(\ln\frac{R_1}{r_1}\right)^{-1}$$

provided that $\Delta r \ll r_2$. $W_{T1}$ and $W_{T2}$ represent thermal energy stored in the column of plasma at the beginning and at the end of the implosion; $W_{M2}$ represents the potential magnetic energy of the column at the end of the implosion.

Regard being had to the large mass of the peripheral column 2, it moves slowly, and its internal surface consequently remains in the vicinity of the external surface of the central column for long enough for the confinement quality factor $x$ to reach a high value.

In practice, these phenomena occur in pulses (about a hundred per second); successive trains of implosions are produced in the peripheral column, confining the central column for long enough periods (of the order of one microsecond).

Finally, implosions in the peripheral column yield a another considerable advantage; they prevent instability of the "hydromagnetic" type in the central column for the duration of the confinement period required to obtain fusion reactions.

Figure 2:
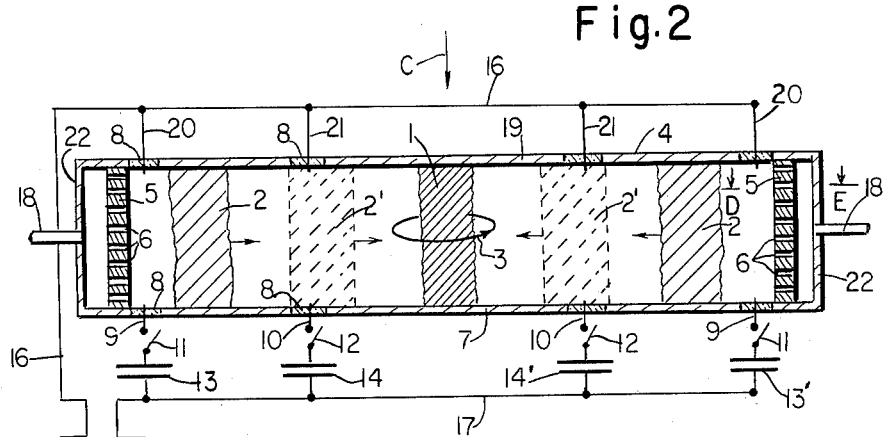
FIGURE 2 is a diagrammatic cross-section of an apparatus for the production of intense magnetic field taken along line A–B of FIGURE 3.
Figure 3:
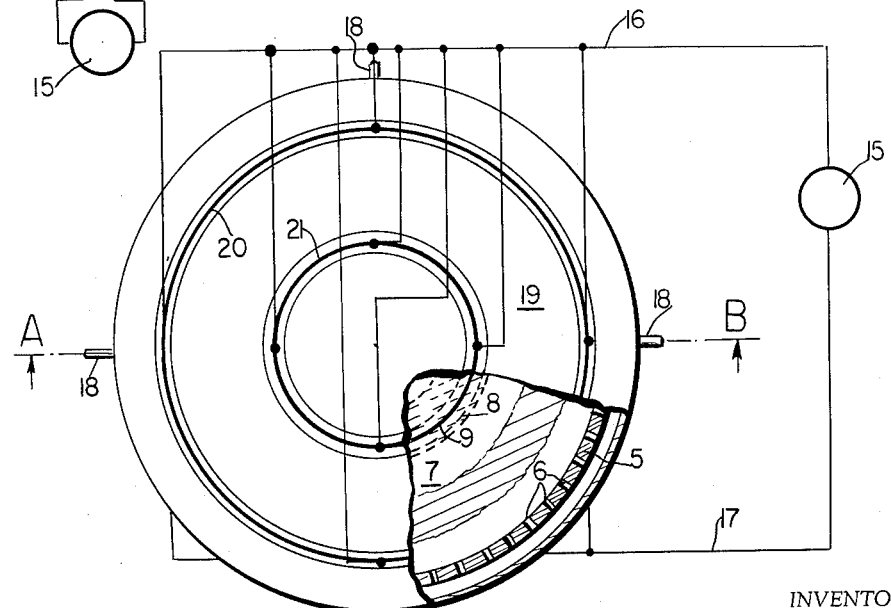
FIGURE 3 is a partial plan view of the apparatus viewed along arrow C of FIGURE 2 and partially broken away along line D–E of FIGURE 2.

The principle of an appliance for carrying out the process will be described in non-limitative fashion hereinafter with reference to FIGURE 2. The devices which will be described in connection with this appliance must be considered as forming part of the invention without limiting the latter, it being understood that any equivalent variants may be used without departing from the scope of the invention.

A cylindrical enclosure 4, in which a vacuum of the order of $10^{-6}$ mm. of mercury is maintained includes a cylinder 5, near the periphery 22, made of porous ceramic material or pierced with orifices such as 6. A plurality of concentric circular electrodes, whereof the drawing shows the electrodes 9 and 10, pass through the electrically insulating parts 8 of the conductive circular base 7. These electrodes are externally connected by switches 11 and 12 to batteries of condensers 13 and 14 which are fed by an electrical source 15. Each electrode may be connected to a plurality of batteries of condensers such as 13 and 13', 14 and 14', in order to pass the electrical discharges to the cylindrical surfaces, and this is encouraged by circular counter-electrodes 20 and 21 disposed in the top 19 opposite to the corresponding electrodes. The counter-electrodes are connected via the return conductor 16 to the distributor conductor 17.

Operation of the switches 11 and 12 is regulated by suitable means, so that the switches 11 all open and close simultaneously, as do all the switches 12, but operation of the switches 12 is staggered with respect to the switches 11, so as to produce a train of electrical discharges between the various concentric electrodes following one another at a frequency of the order of a hundred per second.

The appliance operates as follows:

Let it be assumed that a central column of plasma 1, consisting either of a mixture of deuterium and tritium, or of a mixture formed by vaporising a tritiated lithium deuteride wire by means of electrical discharges, has been set up round the axis of the appliance, and that a brief instant later a blast of gas, whose mass may be between $10^{-2}$ and $10^{-4}$ gram per centimetre and whose height is that of the cylindrical enclosure 4, in introduced via the pipes 18.

When this gas has passed through the porous wall 5, via the apertures 6, it is exposed to an electrical discharge of several tens of kilovolts produced by the batteries of condensers 13, 13' after the switches 11 have been closed. This discharge effects the formation of an annular column 2 of partially ionised gas, and imparts to the said column a centripetal movement which brings it to 2' where it is again heavily short-circuited by closure of the switches 12, causing the batteries of condensers 14, 14' to discharge. A new centripetal pulse is thus imparted to the centripetal movement of the annular column, and it undergoes a new violent implosion which brings it closer to the central column of plasma 1, and causes it to compress the magnetic field B (3, in the figures) towards the axis.

The sequence of the phenomena in order of magnitude may be illustrated by the following durations:

Zero instant—gas begins to be injected.
After 100 microseconds gas injection is stopped—switch 11 closed, batteries of condensers 13, 13' discharged, column 2 centripetally accelerated.
After a further 1.5 microseconds—switch 12 closed.
After a further 0.5 microsecond—batteries of condensers 14, 14' heavily short-circuit into the column 2, which centripetally compresses the magnetic field.
After a further 1 microsecond—magnetic field expands for 1 microsecond.

As regards the values of the various parameters, they may be defined by the following figures:

$W_{C1}=4kJ/cm.$
$W_{T1}=40J/cm.$
$R_1=35$ cm.
$r_1=1$ cm.
$T_1=8.10^5$ ° K.

whence:

$G\approx 280$
$r_2=0.055$ cm.
$T_2=0.8.10^8$ ° K.
$\Delta r=0.014$ cm.

In practice, the electrodes 9, 10 and 9' and 10' may be more than two in number, and the blasts of gas passing through the wall 5 will follow one another at a rate so chosen that a plurality of concentric annular columns can pursue one another from one pair of circular electrodes to the other.

This produces trains of implosions whereof each confines the central plasma for long enough (1 microsecond) and with a stability and quality factor such that deuterium-tritium or deuterium-tritium-lithium fusion reactions can occur in the plasma 1.

The invention is naturally not limited to the form of embodiment which has been described and illustrated by way of example, and modifications may be made without departing from its scope.

I claim:

1. A process for producing intense magnetic fields for the purpose of confining a plasma in order to produce energy by nuclear fusion which comprises subjecting a central column of plasma under a high degree of vacuum to an electrical discharge, thereafter intermittently introducing peripherally around said central column a series of annular columns of gas and subjecting each of said annular columns of gas to a consecutive series of electrical discharges coaxial with said central column of plasma, each of said consecutive series of electrical discharges being closer to said central column of plasma, whereby said series of annular columns of gas assume the shape of centripetally moving annular columns causing a compression of the field confining said central column of plasma.

2. The process according to claim 1 wherein said central column of plasma and said annular columns of gas are of the same nature.

3. The process according to claim 1 wherein said central column of plasma is of a different nature than that of said annular columns of gas.

4. The process according to claim 3 wherein said annular columns of gas are formed by vaporizing a sheet of an element having an atomic number lower than 31, under an electrical discharge.

5. The process according to claim 4 wherein said sheet of an element having an atomic number lower than 31 is a metal sheet.

6. The process according to claim 5 wherein said metal sheet is a sheet of lithium.

7. The process according to claim 5 wherein said metal sheet is a sheet of aluminum.

8. The process according to claim 5 wherein said consecutive series of electrical discharges are of the order of several tens of kilovolts.

9. An appliance for producing intense magnetic fields for the purpose of confining a plasma in order to produce nuclear fusion comprising a pair of spaced circular bases, a cylindrical insulating wall between said bases forming a reaction chamber, said wall adapted to contain a low pressure atmosphere of a gas to be operated upon and having small radial orifices situated therein uniformly around the entire circumference of said wall, means for applying a high vacuum in said reaction chamber, at least two sets of circular electrodes in said bases, each set spaced opposite each other and concentric with the axis of said bases, means for intermittently applying an electrical discharge of several tens of kilovolts between said circular electrodes, first to the outermost set of electrodes and thereafter to the inner sets of electrodes consecutively, means for producing a central column of plasma in said reaction chamber, means for intermittently introducing peripherally into said evacuated reaction chamber through said orifices a gas adapted to confine said plasma, whereby a series of thin cylindrical layers of gas are formed and pass between said sets of circular electrodes, which cylindrical layers of gas are radially compressed by said intermittent consecutive electrical discharges toward the central column of plasma at the axis of said reaction chamber.

10. The appliance of claim 9 wherein said intermittent consecutive electrical discharges are at a frequency of the order of one hundred per second.

References Cited by the Examiner

UNITED STATES PATENTS

| | | | |
|---|---|---|---|
| 2,940,011 | 6/60 | Kolb | 176—7 |
| 2,946,914 | 7/60 | Colgate et al. | |
| 2,960,614 | 11/60 | Mollinckrodt. | |
| 2,961,558 | 11/60 | Luce et al. | 313—63 |
| 2,997,436 | 8/61 | Little et al. | 176—2 |
| 3,113,917 | 12/63 | Linhart | 176—1 |

OTHER REFERENCES

Plasma Physics, by J. G. Linhart, North Holland Pub., Co., Amsterdam, 1960, page 4.

REUBEN EPSTEIN, *Primary Examiner.*

CARL D. QUARFORTH, *Examiner.*